(12) United States Patent
Ohshima et al.

(10) Patent No.: US 8,513,844 B2
(45) Date of Patent: Aug. 20, 2013

(54) MOTOR

(75) Inventors: Eisuke Ohshima, Ota-ku (JP); Hideaki Nakamura, Itabashi-ku (JP)

(73) Assignee: Nidec Copal Corporation, Tokyo (JP)

(*) Notice: Subject to any disclaimer, the term of this patent is extended or adjusted under 35 U.S.C. 154(b) by 208 days.

(21) Appl. No.: 12/989,949

(22) PCT Filed: Apr. 30, 2009

(86) PCT No.: PCT/JP2009/058523
§ 371 (c)(1),
(2), (4) Date: Dec. 21, 2010

(87) PCT Pub. No.: WO2009/133942
PCT Pub. Date: Nov. 5, 2009

(65) Prior Publication Data
US 2011/0109181 A1    May 12, 2011

(30) Foreign Application Priority Data

Apr. 30, 2008 (JP) ................... P2008-119007
May 19, 2008 (JP) ................... P2008-130982

(51) Int. Cl.
*H02K 7/06* (2006.01)
*H01R 39/38* (2006.01)

(52) U.S. Cl.
USPC ........................... 310/81; 310/239

(58) Field of Classification Search
USPC ................... 310/67 R, 81, 239, 246
See application file for complete search history.

(56) References Cited

U.S. PATENT DOCUMENTS

| 4,746,829 A * | 5/1988 | Strobl | 310/239 |
| 6,534,886 B2 * | 3/2003 | An et al. | 310/81 |
| 6,734,594 B2 * | 5/2004 | Lee et al. | 310/220 |
| 6,841,905 B2 * | 1/2005 | Yamaguchi | 310/81 |
| 7,088,022 B2 * | 8/2006 | Yamaguchi et al. | 310/81 |
| 2002/0047370 A1 * | 4/2002 | An et al. | 310/81 |
| 2002/0145347 A1 | 10/2002 | Osawa et al. | |
| 2007/0194642 A1 * | 8/2007 | Yamaguchi et al. | 310/81 |

FOREIGN PATENT DOCUMENTS

| JP | H01-157546 U | 10/1989 |
| JP | H06-60277 U | 8/1994 |
| JP | 2002-282786 | 10/2002 |
| JP | 2005-57926 | 3/2005 |
| JP | 2007-174808 | 7/2007 |
| TW | I252621 | 4/2006 |

OTHER PUBLICATIONS

International Search Report dated Jun. 30, 2009 for International Application No. PCT/JP2009/058523.
Office Action dated Apr. 1, 2013 from Taiwanese Patent Application No. 98116188.

* cited by examiner

*Primary Examiner* — Tran Nguyen
(74) *Attorney, Agent, or Firm* — Beyer Law Group LLP

(57) ABSTRACT

In the invention, in order for a brush assembly to be easily built in a motor, the motor includes an aligning means for aligning a main body portion of the brush assembly relative to a lower case engaging the main body portion with the lower case and a guide means for guiding the brush assembly in a direction which is at right angles to a rotational axis L after the main body portion has been aligned relative to the lower case.

11 Claims, 20 Drawing Sheets

MOTOR

TECHNICAL FIELD

The present invention relates to a small motor adapted to be incorporated in various types of mobile communications terminals (for example, mobile phones), personal digital assistance terminals and game machines for use as a vibrations generating source for a ringing function, for example.

BACKGROUND ART

Conventionally, as a technique in this field, there has been a technique described in JP-UM-A-1-157546. A motor described in this publication has a cylindrical housing which accommodates a rotor, and a bracket is attached to a rear end of the housing. An insertion hole is formed in this bracket through which brushes are inserted. The brushes are formed integrally with a brush connector which closes the insertion hole in the bracket and project from the brush connector. A C-shaped elastic claw is provided on the bracket connector which fits on a guiding projection provided on the bracket, and the elastic claw fits on the guiding projection, whereby the brush connector is fixed to the bracket. In addition, when the brushes are inserted from the insertion hole, the brushes are guided so that distal ends of the left and right brushes are forced to be opened by the guiding projection.

SUMMARY OF THE INVENTION

Problem that the Invention is to Solve

However, in the conventional motor described above, when the brushes are inserted from the insertion hole in the bracket, since the distal ends of the left and right brushes are made to be opened forcibly by the guiding projection before the brushes come into contact with commutators, although there is caused no problem in the event that the brushes are inserted into the insertion hole in a straight-line fashion, when the brushes are inserted from above obliquely, a situation tends to occur easily in which only one of the brushes is forced to be opened by the guiding projection. This has caused a fear that the brush is deformed before it comes into contact with the commutator. In particular, since brushes adapted to be applied to a motor which is small in size and light in weight are very thin and are easy to be deformed, such brushes tend to constitute a problem in making a motor smaller in size.

An object of the invention is to provide a motor which can particularly promote the miniaturization of the motor and eliminate a forced deformation of a brush piece in assemblage of the motor.

Means for Solving the Problem

A motor of the present invention having a core which rotates about a shaft, a commutator which rotates together with the core and a ring-shaped magnet which surrounds the core, is characterized by including: a casing which accommodates the commutator and which includes an upper case and a lower case; a brush assembly into which a main body portion which moves towards the commutator in a direction which is at right angles to a rotational axis of the shaft and slides along an inner surface of the lower case, a pair of brush pieces which project from the main body portion and slide on the commutator while holding the commutator therebetween as a result of movement of the main body portion and a terminal exposed from the main body portion are integrated; aligning means for aligning the main body portion relative to the lower case by engaging the main body portion of the brush assembly with the lower case; and guide means for guiding the brush assembly in a direction which is at right angles to the rotational axis after the main body portion has been aligned relative to the lower case.

The brush assembly that is applied to the motor comprises the main body portion which slides along the inner surface of the lower case, the pair of brush pieces which project from the main body portion and slide while holding the commutators therebetween as a result of the main body portion moving in the way described above and the terminals exposed from the main body portion. By adopting the brush assembly which has the construction described above, the assembling work of the motor is facilitated. In addition, when assembling the motor, by using the aligning means for bringing the main body portion of the brush assembly into engagement with the lower case before the brush assembly is guided in the direction which is at right angles to the rotational axis by the guide means, an assembling step can be taken in which the main body portion is temporarily placed in a predetermined position on the lower case. Consequently, there are provided superior advantages that there is caused no such situation that a forced unbearable load is exerted on the brush pieces before the brush pieces come into contact with the commutators and, moreover, that in assembling the motor, compared with a case in which the brush assembly is directly guided by the guide means, the assembling work of the motor is facilitated and the assembling work can be shifted smoothly to the step of guiding the brush assembly without any difficulty. The exertion of the forced unbearable load on the brush pieces may not only constitute a cause for producing defectives but also affect the accuracy and durability of the motor. In particular, since brushes which are to be used for a motor small in size and light in weight are made very thin and are hence easy to be deformed and a main body portion is also made very small, the invention is particularly effective in miniaturization of motors.

Preferably, the aligning means includes a slit which extends in a direction which is at right angles to the rotational axis of the shaft on the inner surface of the lower case and a projecting portion which projects from the main body portion and which is inserted into the slit. Although the aligning means can be configured by providing a projecting portion on the lower case side and a recess portion on the main body portion side, as in the invention, by providing the slit in the lower case side and the projecting portion on the main body portion side, the main body portion side is easy to be thinned, and this enables the thinning of the brush assembly. This is advantageous in making the motor smaller in size and lighter in weight.

Preferably, a stopper portion is provided at an end portion of the slit which faces the shaft so as to project from the inner surface of the lower case, and the projecting portion goes under a lower side of the stopper portion to be locked. By adopting the configuration described above, the brush assembly can be fastened temporarily on the lower case, thereby making the motor assembling work efficient.

Preferably, the guide means includes a protruding portion which protrudes from the lower case and extends in a direction which is at right angles to the rotational axis of the shaft, and a pair of substantially parallel guide pieces which is provided on the main body portion and is adapted to hold the protruding portion from both sides thereof. Since the main body portion of the brush assembly can be placed on the protruding portion which protrudes from the lower case, the strength of the main body portion can be reinforced by the protruding portion, and this is advantageous in thinning the main body portion. Further, since the main body portion is guided by using the protruding portion when assembling the motor, the protruding portion can be used effectively.

Preferably, a substantially U-shaped cutout portion including a pair of lateral sides which extend in parallel with the rotational axis and which are parallel to each other and an upper side which extends at right angles to the rotational axis between the lateral sides is provided in a lower circumferential edge of the upper case and insertion grooves for insertion of the respective lateral sides are provided in the main body portion. When the upper case is placed on the lower case in such a state that the brush assembly is temporarily fastened on the lower case, both the lateral sides of the cutout portion in the upper case enter the insertion grooves formed in the main body portion. Because of this, the prevention of dislodgement of the brush assembly can be achieved at the same time as the assemblage of the casing.

Preferably, a projecting portion adapted to be pressed against by the upper side is provided on the main body portion. When the upper case is placed on the lower case in such a state that the brush assembly is temporarily fastened on the lower case, the upper side of the cutout portion in the upper case presses against the projecting portion on the main body portion. Because of this, the prevention of looseness of the brush assembly can be achieved at the same time as the assemblage of the casing.

Advantage of the Invention

According to the invention, not only can the promotion of miniaturization of the motor be attained but also a forced deformation of the brush pieces can be eliminated when assembling the motor.

BEST MODE FOR CARRYING OUT THE INVENTION

Figure 1:
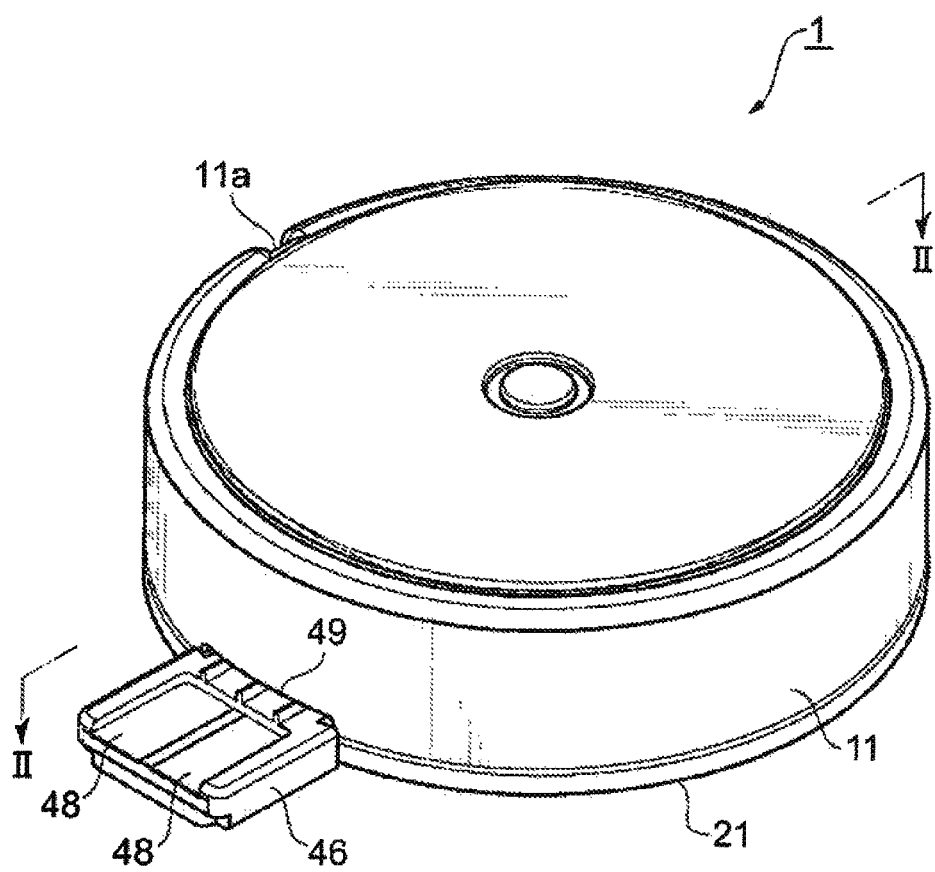
FIG. 1 is an external perspective view showing an embodiment of a motor according to the invention.

Hereinafter, referring to the drawings, a preferred embodiment of a motor according to the invention will be described in detail.

Figure 2:
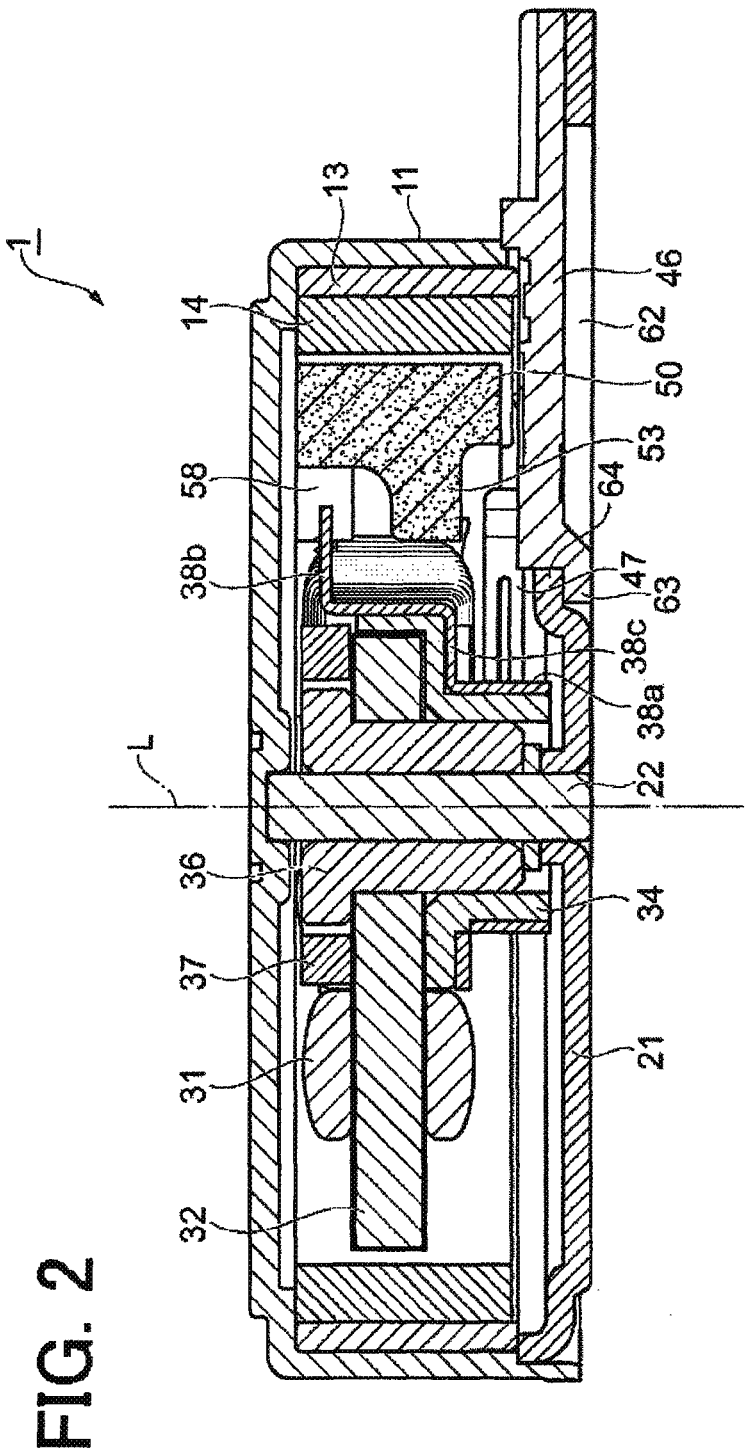
FIG. 2 is a sectional view taken along the line II-II in FIG. 1.
Figure 3:
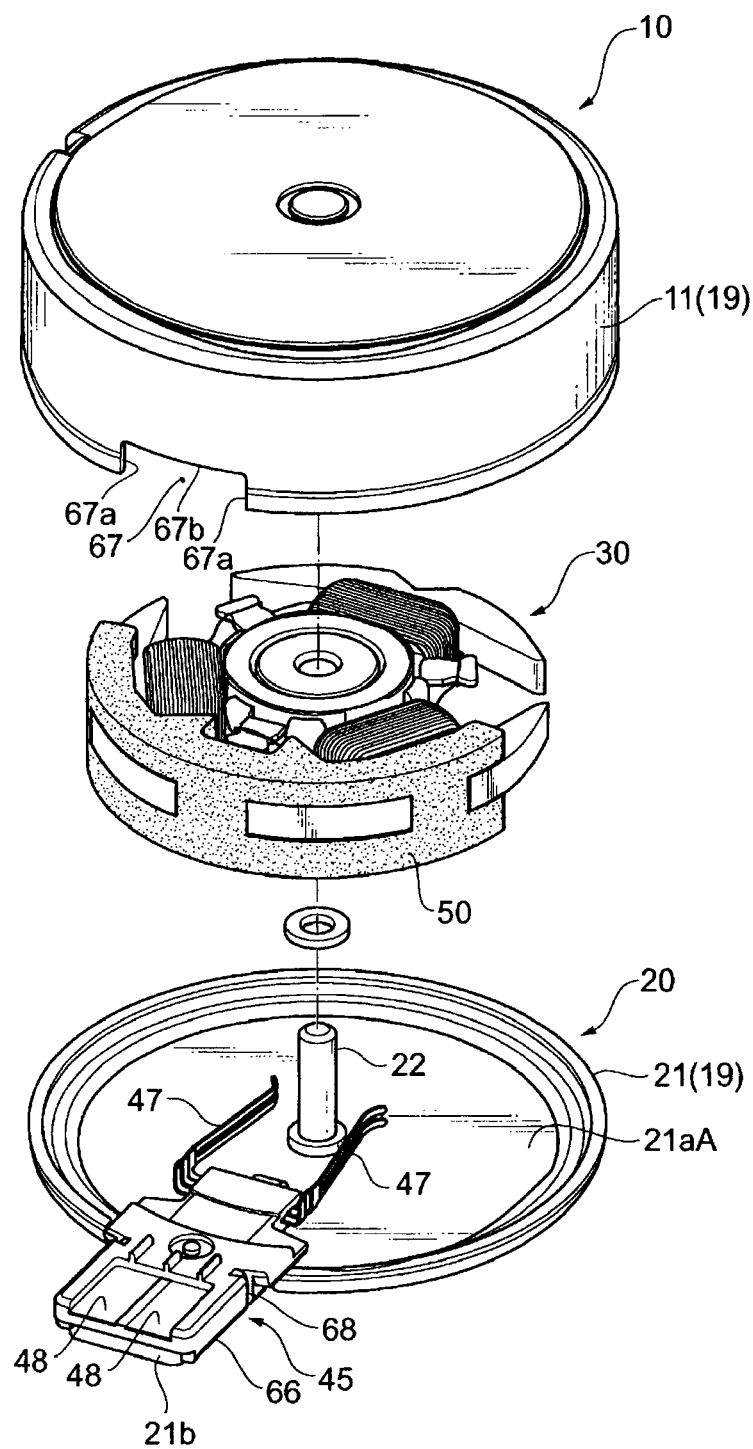
FIG. 3 is an exploded perspective view of the motor according to the invention.

As is shown in FIGS. 1 to 3, a small motor 1 has a coin shape having a diameter of about 10 mm and a thickness of about 3 mm which is suitable for incorporation in a mobile communications terminal (for example, a mobile phone) for use as a vibrations generating source for a ringing function. For facilitation of assembling work, the motor 1 includes an upper case assembly 10 which forms a stator, a lower case assembly 20 forming a base of the motor 1, a rotor assembly 30 which configures a rotor, a brush assembly 45 which enables the supply of electricity and a weight 50 which is made of a metal having a high specific weight (tungsten, for example).

Figure 4:
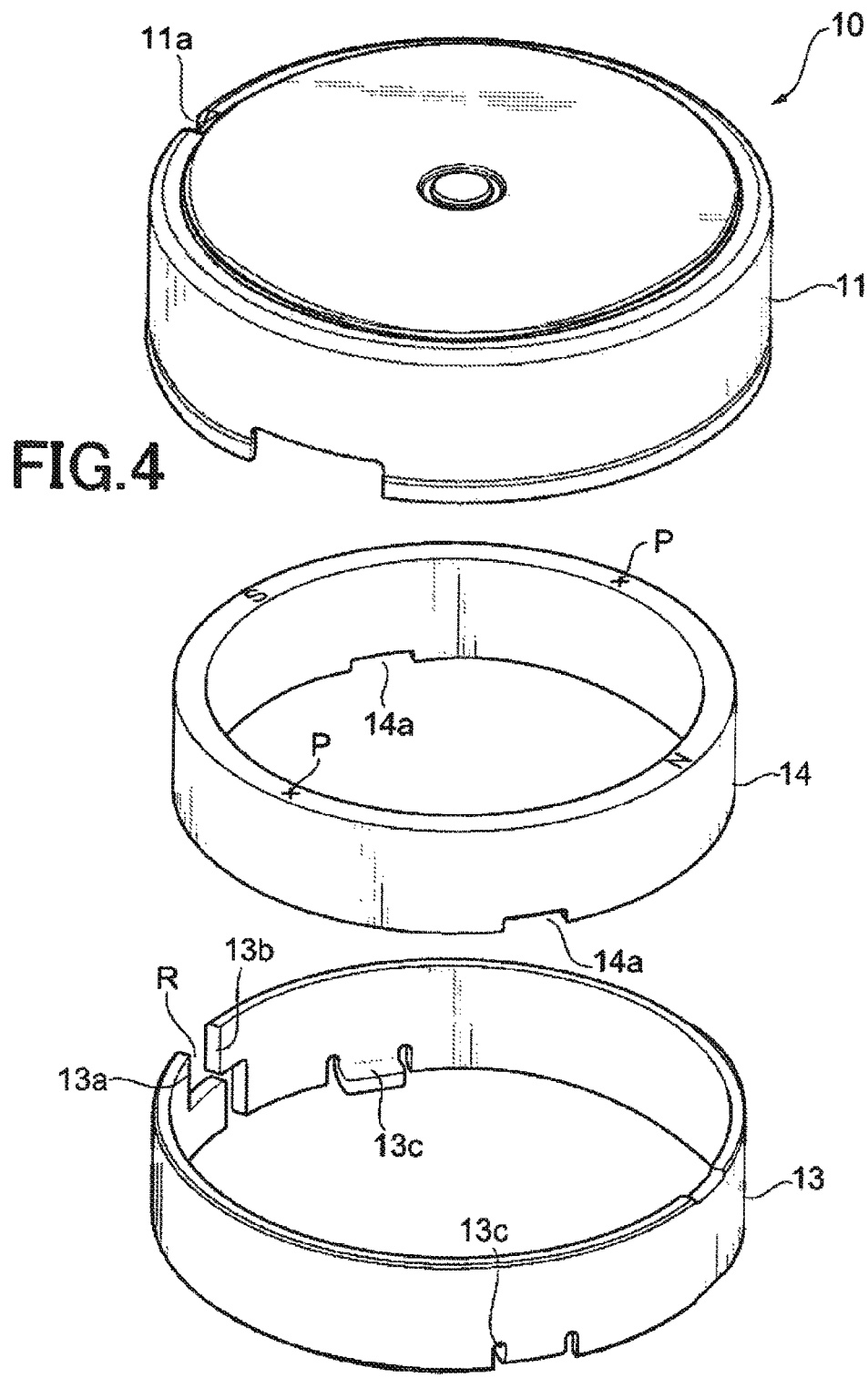
FIG. 4 is an exploded perspective view showing an upper case assembly.

As is shown in FIGS. 3 and 4, the upper case assembly 10 mainly includes a cup-shaped upper case 11 which is made of a non-magnetic material (stainless steel, for example), a C-shaped ring-like back yoke 13 which is fixed to an inner wall surface of the upper case 11 with an adhesive and which is made of a soft magnetic material and a ring-shaped magnet 14 which is fixed to an inner wall surface of the back yoke 13 with an adhesive.

A spaced-apart portion R is provided in the back yoke 13 where opposite ends 13a, 13b are spaced apart from each other. A magnetic circuit can be produced efficiently by disposing this spaced-apart portion R in a position lying 90° away from a magnetic wall P of the magnet 14 (that is, a central position of an S pole). Note that the magnetic wall P means a boundary between an N pole and the S pole of the magnet 14.

Then, a pair of lug pieces 13c is formed on the back yoke 13 so as to project from a lower edge thereof in a radial direction, and a pair of cutout portions 14a is formed in the magnet 14 so that the lug pieces 13c enter the corresponding cutout portions 14a. Then, by the lug pieces 13c being inserted into the cutout portions 14a in the magnet 14, an accurate aligning of the magnet 14 relative to the back yoke 13 is attained.

Further, a projecting portion 11a is formed on the back yoke 13 which projects inwards by working to recess part of an upper circumferential edge of the upper case 11. Then, by causing this projecting portion 11a to be inserted into the spaced-apart portion R in the back yoke 13, the aligning of the back yoke 13 relative to the upper case 11 is attained.

Figure 5:
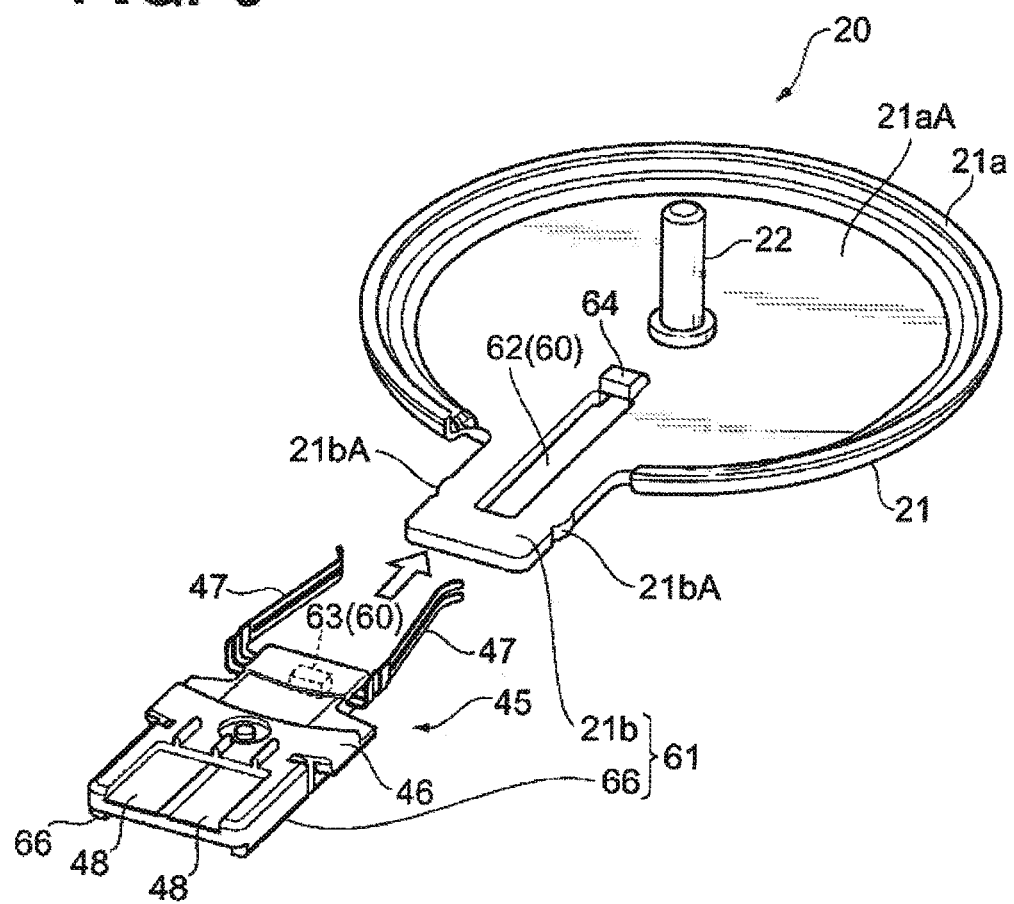
FIG. 5 is an exploded perspective view showing a lower case assembly.

As is shown in FIG. 5, the lower case assembly 20 includes a dish-shaped lower case 21 which is to be joined to the upper case 11 through laser welding and which is made of a non-magnetic material (for example, stainless steel) and a shaft 22 which is fixed to a center of the lower case 21. A protruding portion 21b is provided on the lower case 21 which protrudes radially from a dish-shaped main body portion 21a. Further, the brush assembly 45 is fixed to the lower case 21 and the brush assembly 45 is disposed on the protruding portion 21b.

Figure 6:
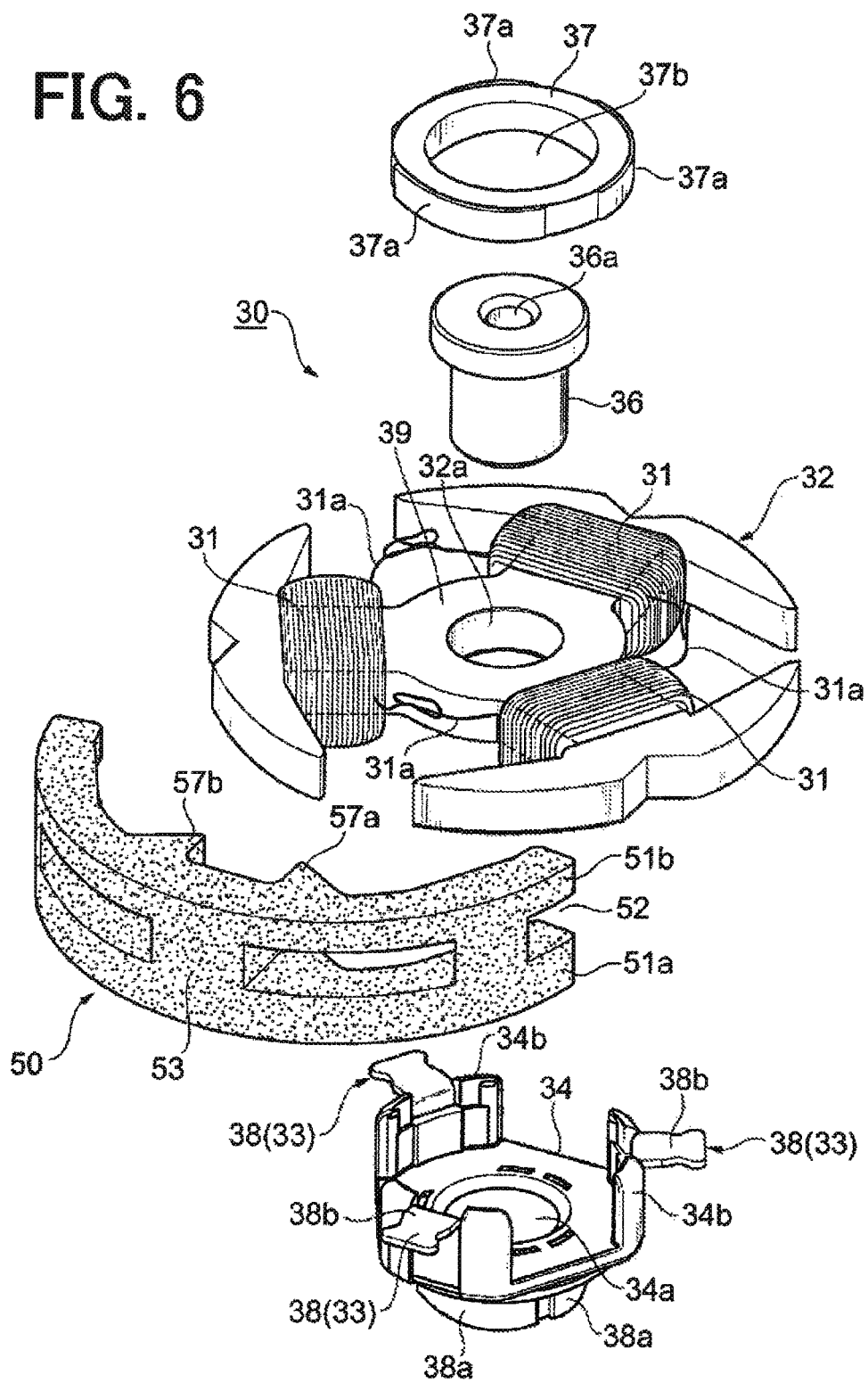
FIG. 6 is an exploded perspective view showing a rotor assembly and a weight.
Figure 7:
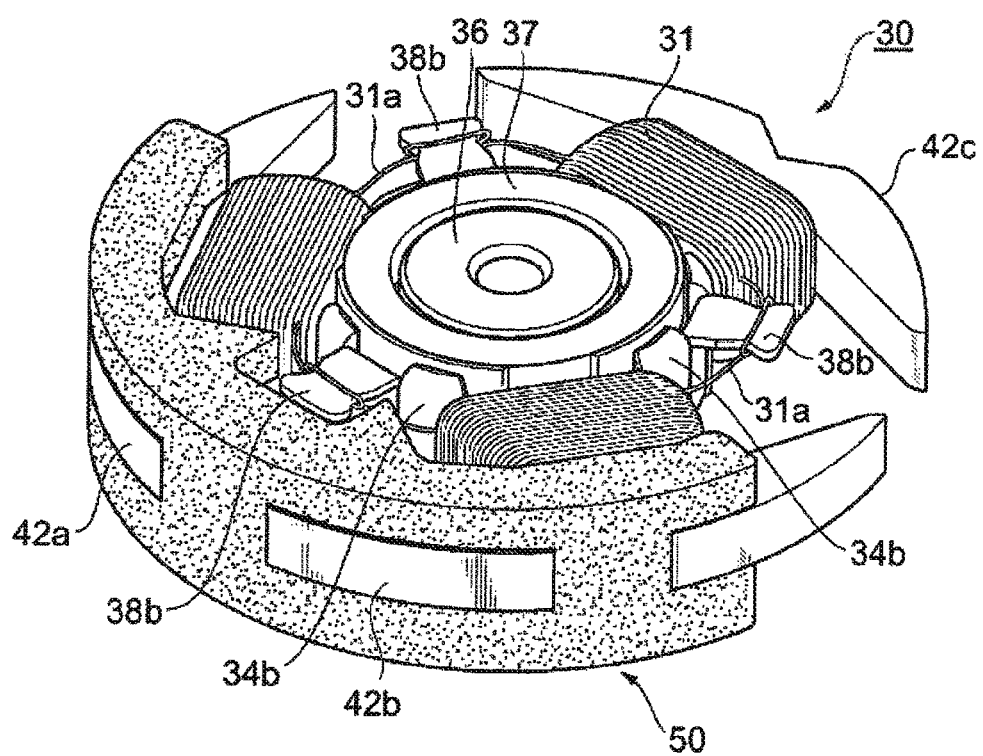
FIG. 7 is a perspective view showing the rotor assembly and the weight.
Figure 8:
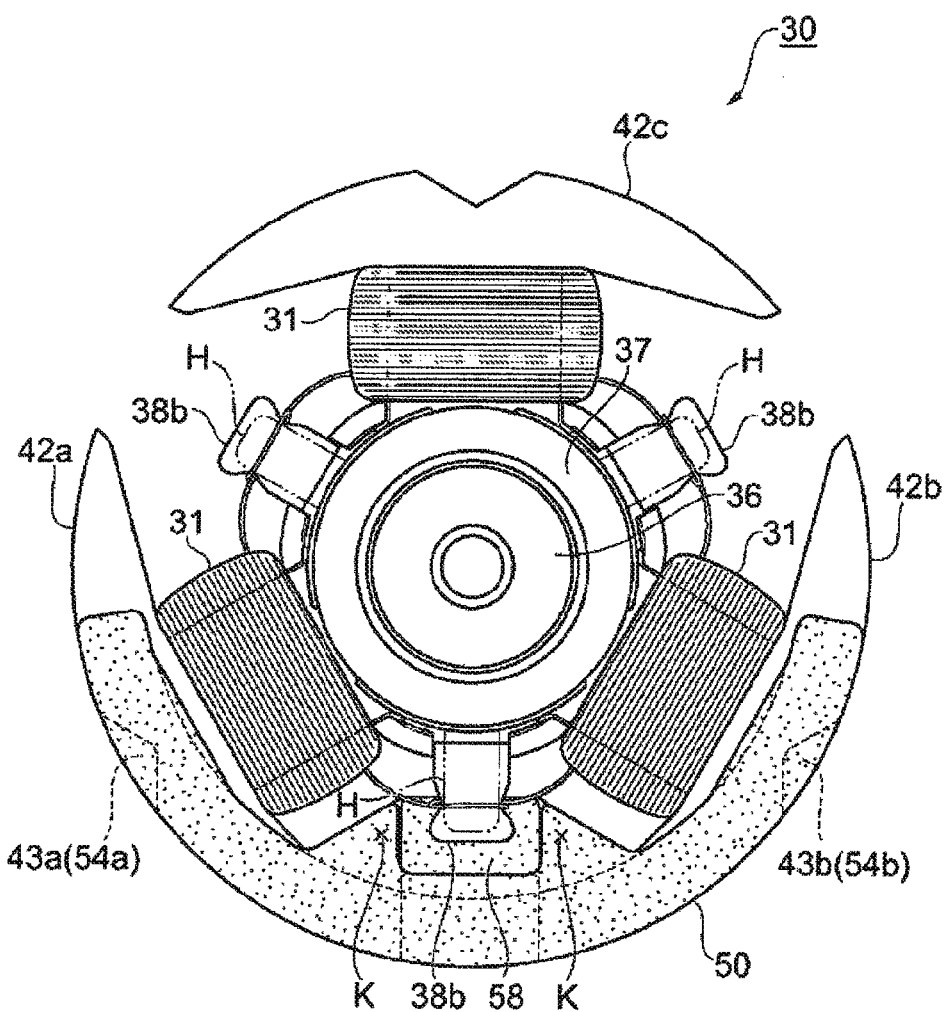
FIG. 8 is a plan view showing the rotor assembly and the weight.

As is shown in FIG. 3, the rotor assembly 30 is accommodated in a casing 19 which includes the upper case 11 and the lower case 21 and is rotatably supported on the shaft 22 so as to rotate freely thereon. Further, as is shown in FIGS. 6 to 8, this rotor assembly 30 includes coils 31, a core 32 round which the coils 31 are wound, a commutator 33 which supply a electric current to the coils 31, a commutator holder 34 for holding the commutator 33, a cylindrical bearing 36 which is press fitted in a central hole 32a in the core 32 and which has a shaft hole 36a into which the shaft 22 is inserted, and a varistor 37 which prevents the generation of spark and noise.

This motor 1 has two poles and three slots, and the core 32 is made by laminating three sheets of silicone steel which are punched out and which each have a thickness of 0.2 mm. The commutator 33 includes three commutator segments 38 which are fabricated by pressing a sheet of copper. Each commutator segment 38 includes a brush slide contact portion 38a which has an arc-like section and which extends along a rotational axis L, a riser portion 38b to which the coil 31 is connected and which extends in a radial direction of the core 32 to project into a slot, and an L-shaped connecting portion 38c which connects the brush slide contact portion 38a with the riser portion 38b (refer to FIG. 2). Note that the core 32 may be made up of a single plate.

The three commutator segments 38 are assembled to the commutator holder 34, whereby a commutator assembly is configured. This commutator assembly is integrated with the core 32 by the bearing 36 being press fitted in a central hole 34a in the commutator holder 34.

Further, the ring-shaped varistor 37 is held by individual erected portions 34b which are provided on a circumferential edge of the commutator holder 34, and a top portion of the bearing 36 is inserted into a central hole 37b in the varistor 37. In this way, after the varistor 37 is fixed in place on the core 32, an electric wire 31a of the coil 31 is wound round a distal end of the riser portion 38b, and each electric wire 31a, the riser portion 38b and each electrode 37a of the varistor 37 are electrically connected together through soldering H.

As is shown in FIG. 5, the brush assembly 45 includes a plate-shaped main body portion 46 which can be attached to the lower case 21, a pair of brush pieces 47 which projects from the main body portion 46 to be brought into contact with the brush slide contact portion 38a of each commutator segment 38, and a pair of terminals 48 which is exposed from the upper case 11 at an end portion of the main body portion 46. In addition, the brush pieces 47 and the terminals 48 are connected to each other within the main body portion 46. After the shaft 22 is inserted within the bearing hole 36a in the bearing 36 of the rotor assembly 30, the brush assembly 45 is attached to the lower case 21 from a radial direction, and part thereof is exposed in the radial direction from a rectangular opening 49 (refer to FIG. 1) which is formed by assembling the upper case 11 and the lower case 21 together.

As is shown in FIGS. 8 to 12, the weight 50 is fixed to the core 32. This core 32 includes a ring-shaped central portion 39 (refer to FIG. 6) which has the central hole 32a in which the bearing 36 is press fitted and salient poles 40a, 40b, 40c which projects radially from the central portion 39. The respective salient poles 40a, 40b, 40c, which are disposed at equal intervals, includes winding portions 41a, 41b, 41c round which the coils 31 are wound and wing portions 42a, 42b, 42c which extend in circumferential directions from end portions of the winding portions 41a, 41b, 41c, respectively.

The weight 50 includes first and second weight portions 51a, 51b which extend along the wing portions 42a, 42b so as to hold the adjacent wing portions 42a, 42b from thereabove and therebelow, a slit-shaped insertion portion 52 which extends between the first weight portion 51a and the second weight portion 51b and enables the insertion of the adjacent wing portions 42a, 42b, and a third weight portion 53 which connects the first weight portion 51a and the second weight portion 51b together in the direction of the rotational axis L so as to divide the insertion portion 52 horizontally and which is inserted between the adjacent wing portions 42a, 42b (namely, into the slot).

Since the third weight portion 53 has substantially the same width as a space B between an end of the wing portion 42a and an end portion of the wing portion 42b, a horizontal (circumferential) looseness of the third weight portion 53 can be suppressed by the wing portions 42a, 42b.

This weight portion 50 is attached so as to be inserted radially relative to the core 32. As this occurs, since the respective wing portions 42a, 42b of the core 32 are inserted into the insertion portion 52 in the weight 50 while guiding the first and second weight portions 51a, 51b which extend in parallel in top and bottom, the assembling capability of the weight 50 to the core 32 is improved very much. Then, since the third weight portion 53 which constitutes part of the weight 50 is disposed between the salient pole 40a and the salient pole 40b, which is locations enabling the motor 1 to vibrate easily, (that is, into the slot), the vibration of the motor 1 at high frequencies can be ensured.

Further, since the first and second weight portions 51a, 51b extend along the wing portions 42a, 42b, respectively, portions of the first and second weight portions 51a, 51b which lie on the wing portions 42a, 42b, respectively, are also allowed to contribute to the vibration of the motor 1 effectively. In the event of the diameter of the core 32 being reduced in association with miniaturization of the motor 1, those portions can ensure the mass of the weight 50, whereby the reduction in vibrating amount of the motor 1 due to the miniaturization of the motor 1 can be suppressed.

In order to improve further the assembling capability of the weight 50 to the core 32, recess portions 43a, 43b are formed in circumferential surfaces of outside diameter portions of the wing portions 42a, 42b, and locking portions 54a, 54b are provided on the weight 50 which connect the first weight portion 51a and the second weight portion 51b together and which are inserted and fitted, respectively, in the recess portions 43a, 43b of the wing portions 42a, 42b.

Figure 9:
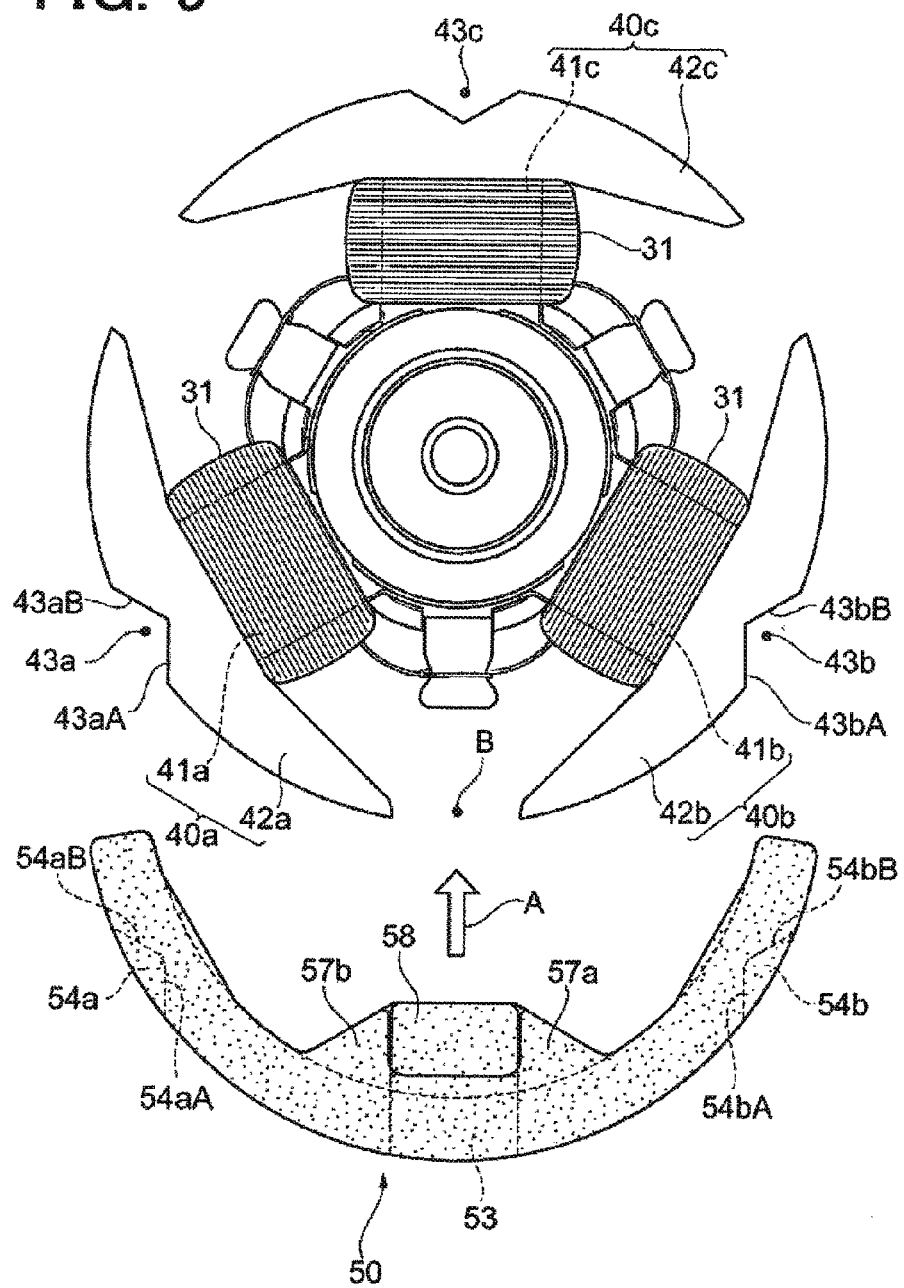
FIG. 9 is a plan view showing a state resulting before the weight is assembled on to the rotor assembly.
Figure 10:
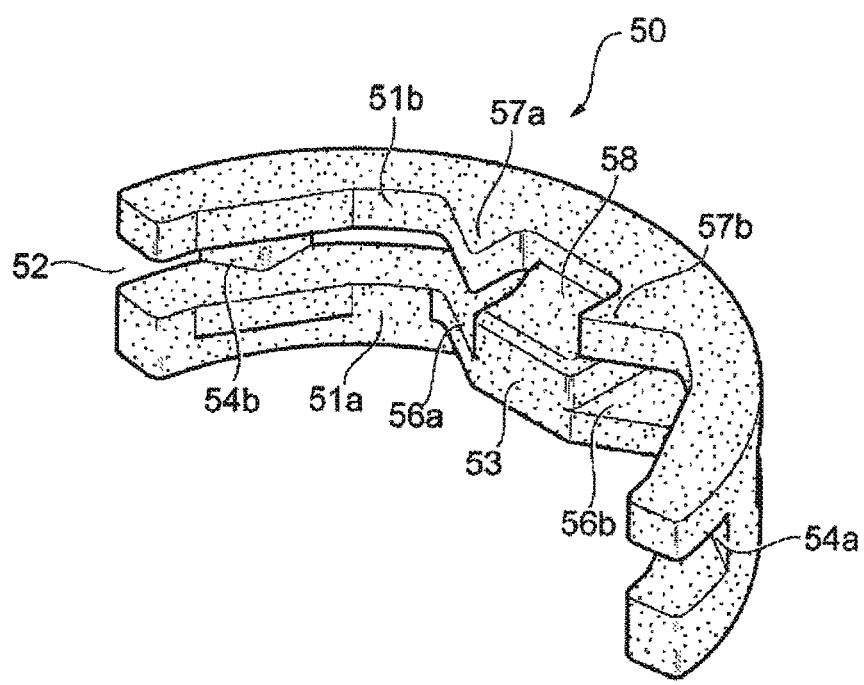
FIG. 10 is a perspective view showing the weight which is applied to the motor according to the invention.
Figure 11:
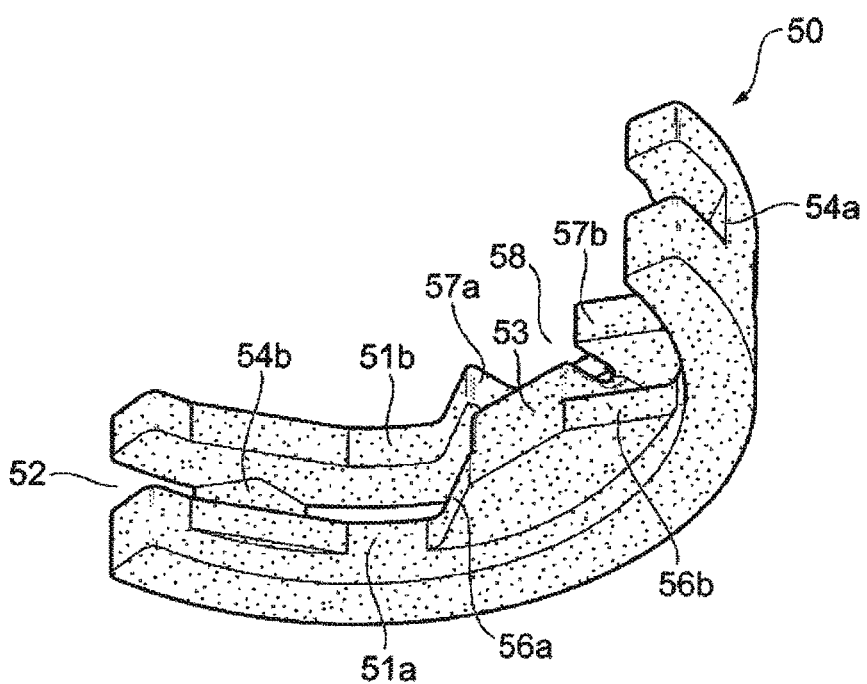
FIG. 11 is a perspective view of the weight viewed at a different angle.
Figure 12:
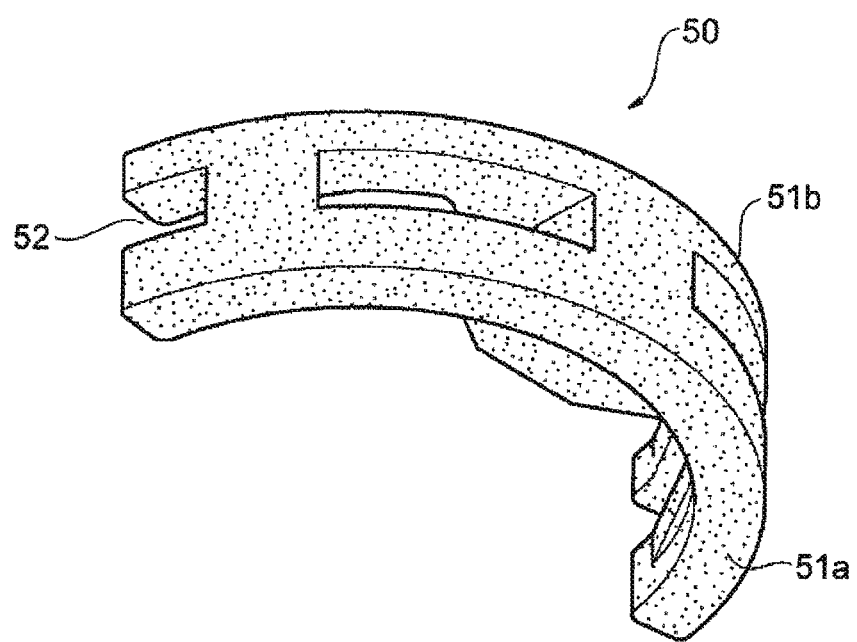
FIG. 12 is a perspective view of the weight viewed at a further angle.

The recess portions 43a, 43b and the locking portions 54a, 54b each have a triangular shape and are attached closely to each other. In addition, as is shown in FIG. 9, one wall surface 43aA of two wall surfaces of the recess portion 43a extends in substantially the same direction as an attaching direction A, and one wall surface 43bA of two wall surfaces of the recess portion 43b extends in substantially the same direction as the attaching direction A. Similarly, one wall surface 54aA of two wall surfaces of the locking portion 54a extends in substantially the same direction as the inserting direction A, and one wall surface 54bA of two wall surfaces of the locking portion 54b extends in substantially the same direction as the inserting direction A.

By this configuration, during the attaching work of the weight 50, the locking portions 54a, 54b are allowed to enter the recess portions 43a, 43b easily and in an ensured fashion, and by causing the other wall surfaces 54aB, 54bB of the locking portions 54a, 54b of the weight 50 to strike the other wall surfaces 43aB, 43bB of the recess portions 43a, 43b, a aligning of the weight 50 at a far side in the inserting direction (attaching direction) can be attained easily and in an ensured fashion. Moreover, since the locking portions 54a, 54b constitute part of the weight 50, these locking portions 54a, 54b are allowed to contribute to the vibration of the motor 1.

In order to improve further the assembling capability of the weight 50 to the core 32, a pair of left and right first clamping portions 56a, 56b and a pair of left and right second clamping portions 57a, 57b are provided on the weight 50. The clamping portions 56a, 56b, 57a, 57b also make pairs in the direction of the rotational axis L, lie adjacent to the third weight portion 53 which has a rectangular parallelepiped block-like shape and project from the first and second weight portions 51a, 51b over the corresponding wind portions 42a, 42b so as to project between the salient poles 40a, 40b.

In addition, by pressing striking points K (refer to FIG. 8) on the second clamping portions 57a, 57b from thereabove while supporting the first clamping portions 56a, 56b which lie thereabove are supported on a table or the like, the first and second clamping portions 56a, 56b, 57a, 57b are clamped in the direction of the rotational axis L so that the first clamping portions 56a, 56b and the second clamping portions 57a, 57b approach each other. As a result, the weight 50 can be made difficult to be dislodged in the direction of the rotational axis L, whereby the weight 50 can be fixed to the core 32 easily and in an ensured fashion by the clamping work described above.

In addition, since no laser welding has to be implemented near the coils 31, a risk of disconnection of the coils 31 by laser can be avoided. Further, since the first and second clamping portions 56a, 56b, 57a, 57b which constitute part of the weight 50 are disposed between the salient poles 40a, 40b where the motor 1 is vibrated easily, the respective clamping portions 56a, 56b, 57a, 57b coupled with the third weight portion 53 contribute to the vibration of the motor 1 at high frequencies.

Further, the pair of first clamping portions 56a, 56b which each have the triangular shape is integrated into the third weight portion 53 in such a way as to hold the third weight portion 53 from both sides thereof. In contrast, the pair of second clamping portions 57a, 57b which each have the triangular shape is disposed so as to confront the first clamping portions 56a, 56b, respectively and are spaced apart from the third weight portion 53.

In this way, since the second clamping portions 57a, 57b are spaced apart from the third weight portion 53, the second clamping portions 57a, 57b are made easy to be bent by clamping work. Consequently, the clamping work is easy to be applied to the weight 50 which is made of a hard material such as tungsten, thereby making it difficult for a failure such as a crack to occur in the weight 50 when the clamping work is performed.

Further, a recess portion 58 is formed between the second clamping portions 57a, 57b above the third weight portion 53, and the riser portion 38b, which extends in the radial direction, is inserted into the recess portion 58. The extension of the riser portion 38b in the radial direction of the core 32 enables the thinning of the motor 1, and the third weight portion 53 is allowed to extend in the radial direction of the core 32 without being interrupted by the riser portion 38b configured in the way described above, thereby making it possible to increase the mass of the weight 50.

As is shown in FIGS. 8 and 9, a recess portion 43c is also provided in the wing portion 42c of the remaining salient pole 41c which has the same configuration as those formed in the salient poles 40a, 40b. By adopting this configuration, the weight 50 can be attached to any of the salient poles 40a, 40b, 40c, whereby the assembling capability of the weight 50 to the cores 32 is improved extremely well.

Next, the brush assembly 45 will be described in greater detail.

As is shown in FIGS. 5 and 13 to 15, the brush assembly 45 includes a main body portion 46 made of resin which moves towards the commutator 33 in a direction which is at right angles to the rotational axis L of the shaft 22 and slides along an inner surface 21aA of the main body portion 21a of the lower case 21, a pair of brush pieces 47 which project from the main body portion 46 and slide while holding the commutator 33 therebetween as the main body portion 46 so moves, a pair of terminals 48 which are exposed from the main body portion 46, and connecting portions 59 which each connect one of the brush pieces 47 with one of the terminals 48 within the main body portion 46, and these constituent members are integrated into one unit through insert molding.

Further, in order to facilitate the incorporation of the extremely small brush assembly 45 which has a thickness of about 0.4 mm, an overall length (a length from an end portion of the main body portion 46 to a distal end of the brush piece 47) of 7 mm and a width of 3 mm into the motor 1, the motor 1 includes an aligning means 60 (refer to FIG. 17) for aligning the main body portion 46 relative to the lower case 21 with engaging the main body portion 46 of the brush assembly 45 with the lower case 21 and a guide means 61 (refer to FIG. 5) for guiding the brush assembly 45 in a direction which is at right angles to the rotational axis L after the main body portion 46 has been aligned relative to the lower case 21.

By adopting the brush assembly 45 which has the construction described above, the assembling work of the motor 1 is facilitated. In addition, in assembling the motor 1, by using the aligning means 60 for bringing the main body portion 46 of the brush assembly 45 into engagement with the lower case 21 before the brush assembly 45 is guided in the direction which is at right angles to the rotational axis L by the guide means 61, an assembling step can be taken in which the main body portion 46 is temporarily placed in a predetermined position on the lower case 21.

Consequently, there occurs no such situation that an unbearable load is exerted on the brush pieces 47 before the brush pieces 47 are brought into contact with the commutator 33. Moreover, in assembling the motor 1, compared with a case in which the brush assembly 45 is directly guided by the guide means 61, there are provided superior advantages that the assembling work of the motor is facilitated and that the assembling work can be shifted smoothly to the step of guiding the brush assembly 45 without any difficulty.

The exertion of the forced unbearable load on the brush pieces 47 may not only constitute a cause for producing defectives but also affect the accuracy and durability of the motor. In particular, since the brushes which are to be used for the motor 1 small in size and light in weight are made very thin and are hence easy to be deformed and the main body portion 46 is also made very small, the invention is particularly effective in miniaturization of motors.

Figure 17:
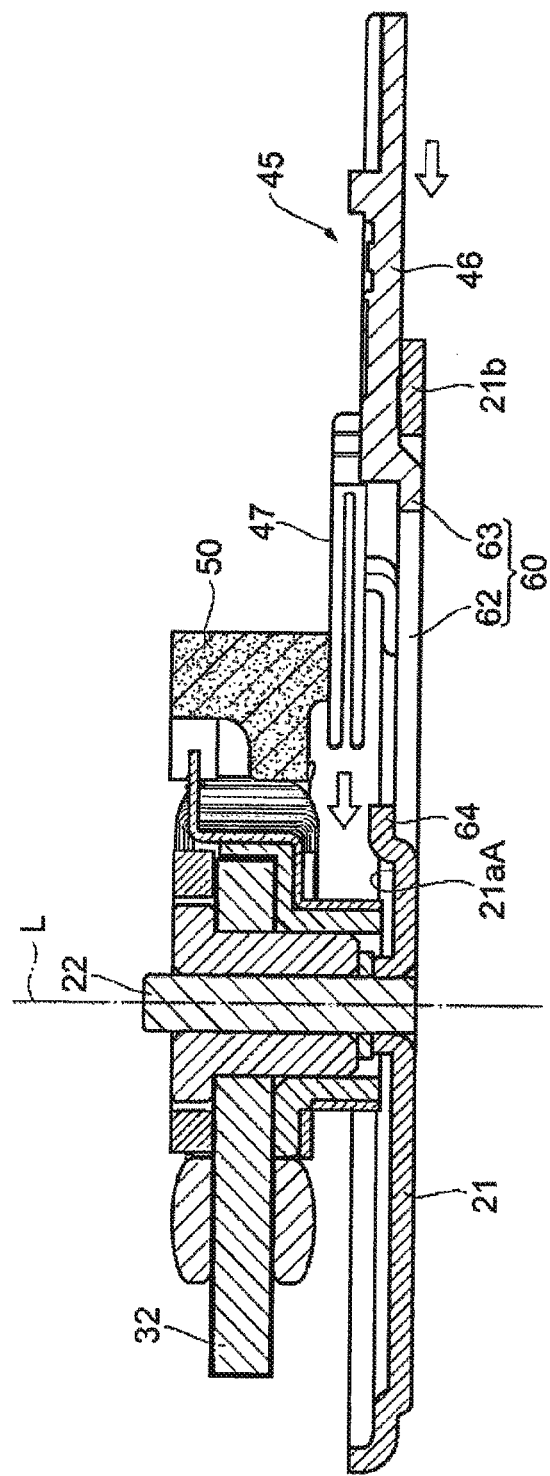
FIG. 17 is a sectional view showing a state in which a projecting portion on the brush assembly is inserted into a slit in the lower case.

The aligning means 60 includes a slit 62 which extends on a circular inner surface of the lower case 21 in a direction which is at right angles to the rotational axis L of the shaft 22 and a projecting portion 63 which projects from the main body portion 46 and is inserted into the slit (refer to FIG. 17). In addition, the slit 62 extends from the main body portion 21a of the lower case 21 as far as the protruding portion 21b, and by using the protruding portion 21b, the slit 62 can be made long, thereby allowing the projecting portion 63 to be inserted into the slit 62 before the individual brush pieces 47 come into contact with the commutator 33.

In this way, by providing the slit 62 on the lower case 21 side and providing the projecting portion 63 on the main body portion 46 side, the main body portion 46 side is made easy to be thinned, enabling the thinning of the brush assembly 45. This is advantageous in making the motor 1 small in size and light in weight.

Further, a stopper 64 is provided at an end portion of the slit 62 which faces the shaft 22 so as to project from the inner surface 21aA of the lower case 21, and the projecting portion 63 goes under a lower side of the stopper 64 to be locked after the brush assembly 45 has completed its travel (refer to FIGS. 2 and 17). By doing this, the brush assembly 45 can be fastened temporarily on the lower case 21, whereby the assembling work of the motor 1 is made efficient.

Figure 16:
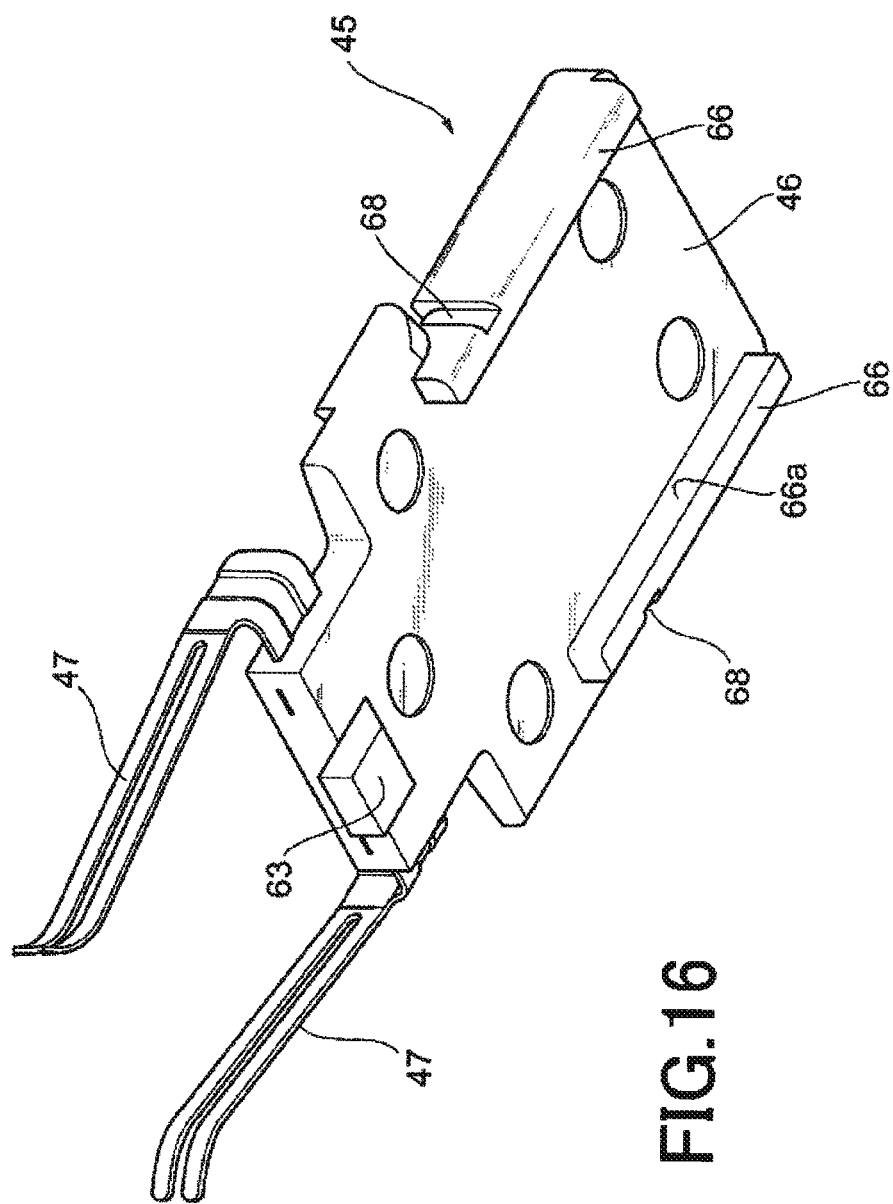
FIG. 16 is a perspective view of the brush assembly viewed from a bottom side thereof.

As is shown in FIGS. 5 and 16, the guide means 61 includes the protruding portion 21b which protrudes from the lower case 21 and extends in a direction which is at right angles to the rotational axis L of the shaft 22 and a pair of substantially parallel guide pieces 66 which are provided on the main body portion 46 and which hold the protruding portion 21b therebetween from both sides thereof (refer to FIG. 5).

By adopting this configuration, since the main body portion 46 of the brush assembly 45 can be placed on the protruding portion 21b which protrudes from the lower case 21, the bending strength of the main body portion 46 can be reinforced by the protruding portion 21b, which is advantageous in thinning the main body portion 46. Further, since the main body portion 46 is made to be guided by using the protruding portion 21b configured as described above in assembling the motor 1, the protruding portion 21b can be used effectively.

Further, press contacting portions 21bA having a circularly projecting shape are formed on both lateral surfaces of the protruding portion 21b, and during the assembling work, these press contacting portions 21bA contact under pressure to inner wall surfaces 66a (refer to FIG. 16) of the guide pieces 66 at distal ends thereof, whereby the brush assembly 45 can be fastened temporarily on the inner surface 21aA of the lower case 21 by the individual press contacting portions 21bA. Thus, the assembling work of the motor 1 can be made efficient.

Figure 13:
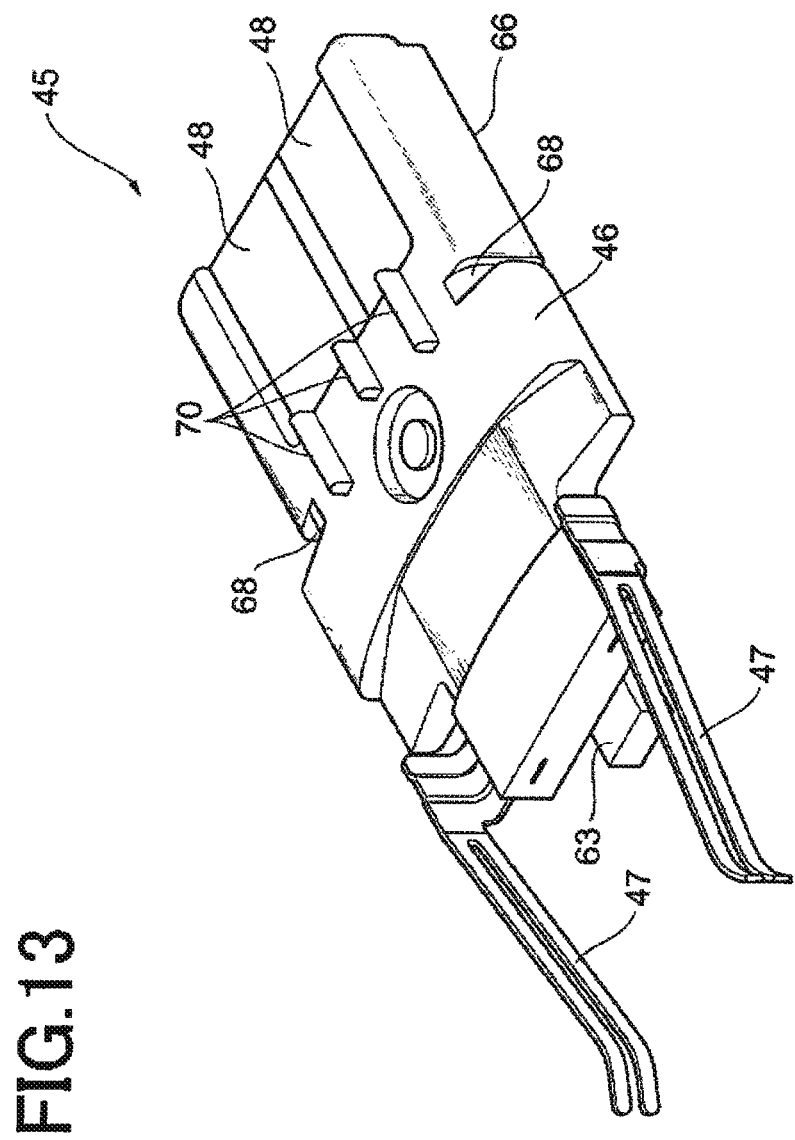
FIG. 13 is a perspective view showing a brush assembly which is applied to the motor according to the invention.
Figure 14:
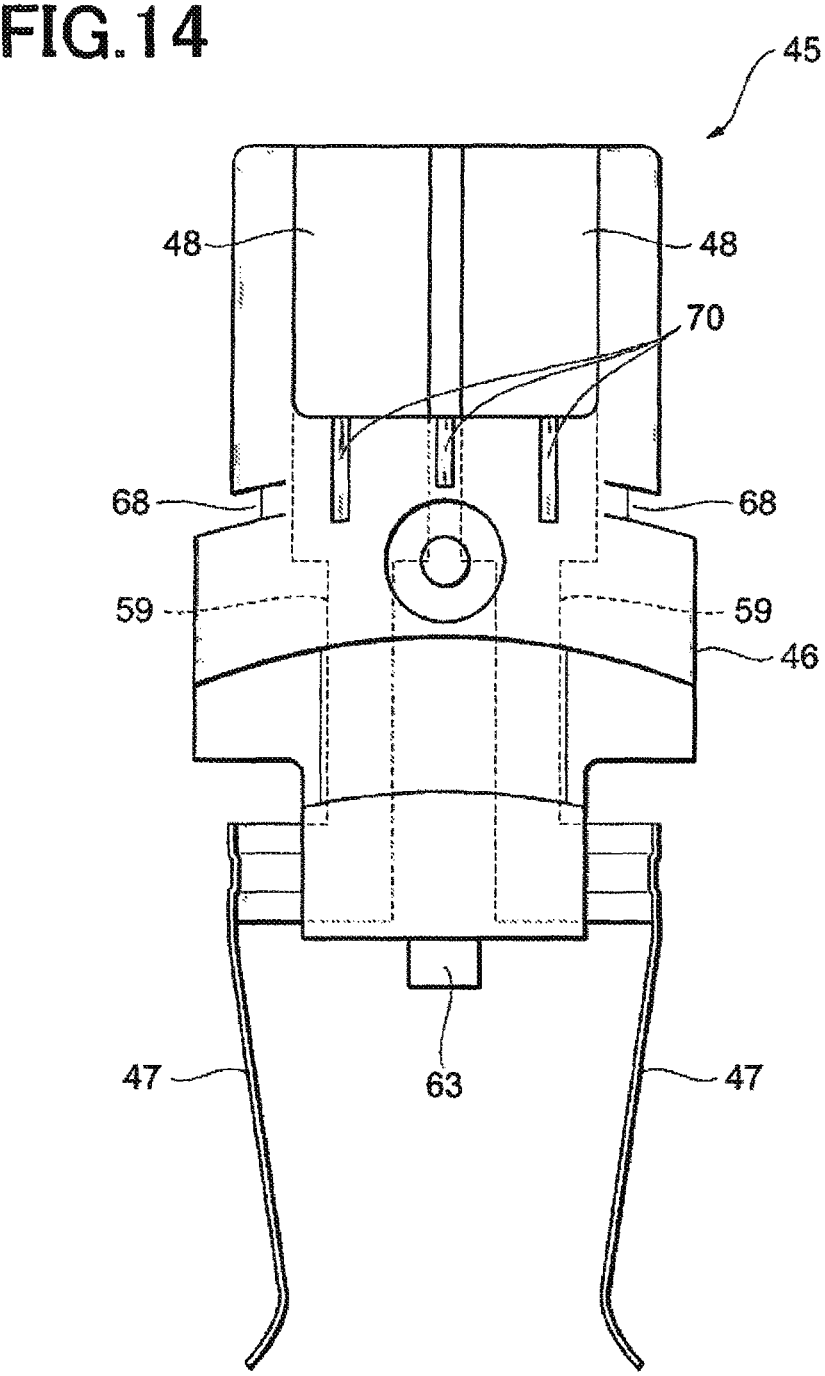
FIG. 14 is a plan view of the brush assembly shown in FIG. 13.
Figure 15:
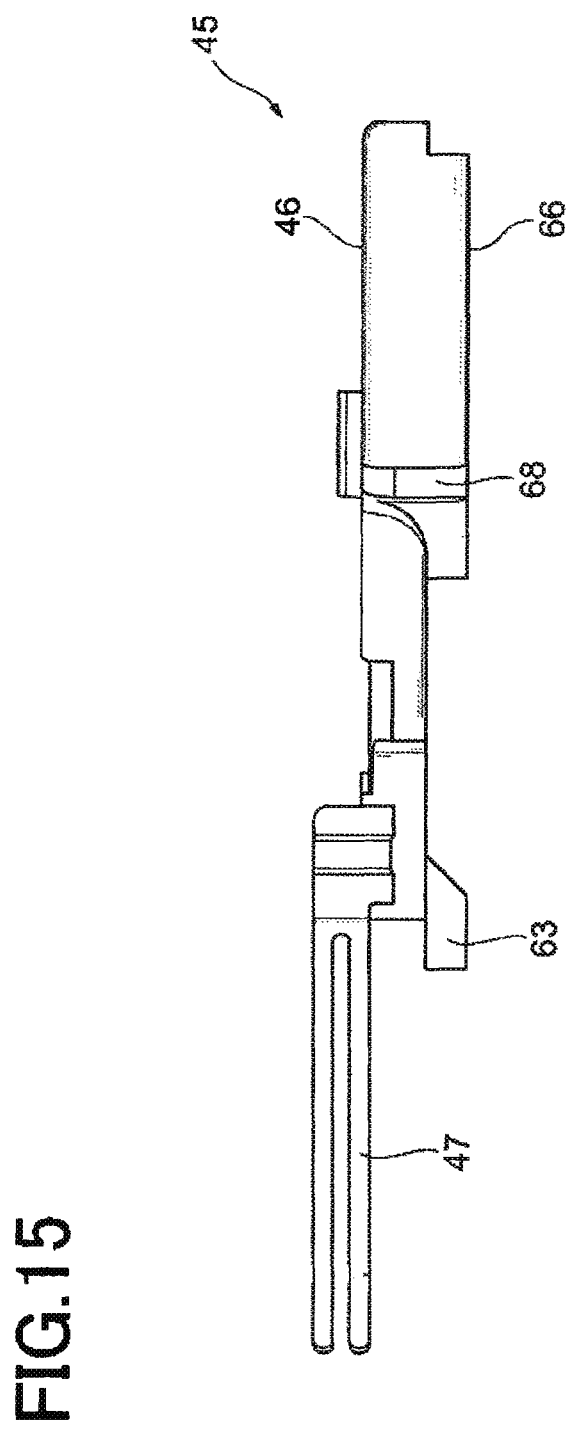
FIG. 15 is a side view of the brush assembly.

As is shown in FIGS. 3 and 13, a substantially U-shaped cutout portion 67 is provided in a lower circumferential edge of the upper case 11 which includes a pair of parallel lateral sides 67a which extend in parallel with the rotational axis L and an upper side 67b which extends between both the lateral sides 67a in a direction which is at right angles to the rotational axis L. In contrast to this, insertion grooves 68 are provided on the main body portion 46 of the brush assembly 45 in which the respective lateral sides 67a are inserted.

When the upper case 11 is placed over the lower case 21 in such a state that the brush assembly 45 is fastened temporarily on the lower case 21, both the lateral sides 67a of the cutout portion 67 in the upper case 11 enter the respective insertion grooves 68 on the main body portion 46, whereby the dislodgement of the brush assembly 45 can be attained at the same time as the casing 19 has been built up.

Further, three straight-line projecting portions 70 which are pressed by the upper side 67b are provided on the main body portion 46. Consequently, when the upper case 11 is placed over the lower case 21 in such a state that the brush assembly 45 is fastened temporarily on the lower case 21, the upper side 67b of the cutout portion 67 of the upper case 11 presses against the respective projecting portions 70 on the main body portion 46, whereby the prevention of looseness of the brush assembly 45 can be attained at the same time as the assemblage of the upper case 11 on to the lower case 21 has been completed.

Needless to say, the invention is not limited to the embodiment that has been described above. For example, the aligning means 60 may such that the lower case 21 has a projecting configuration, while the main body portion has a recessed configuration.

Figure 18:
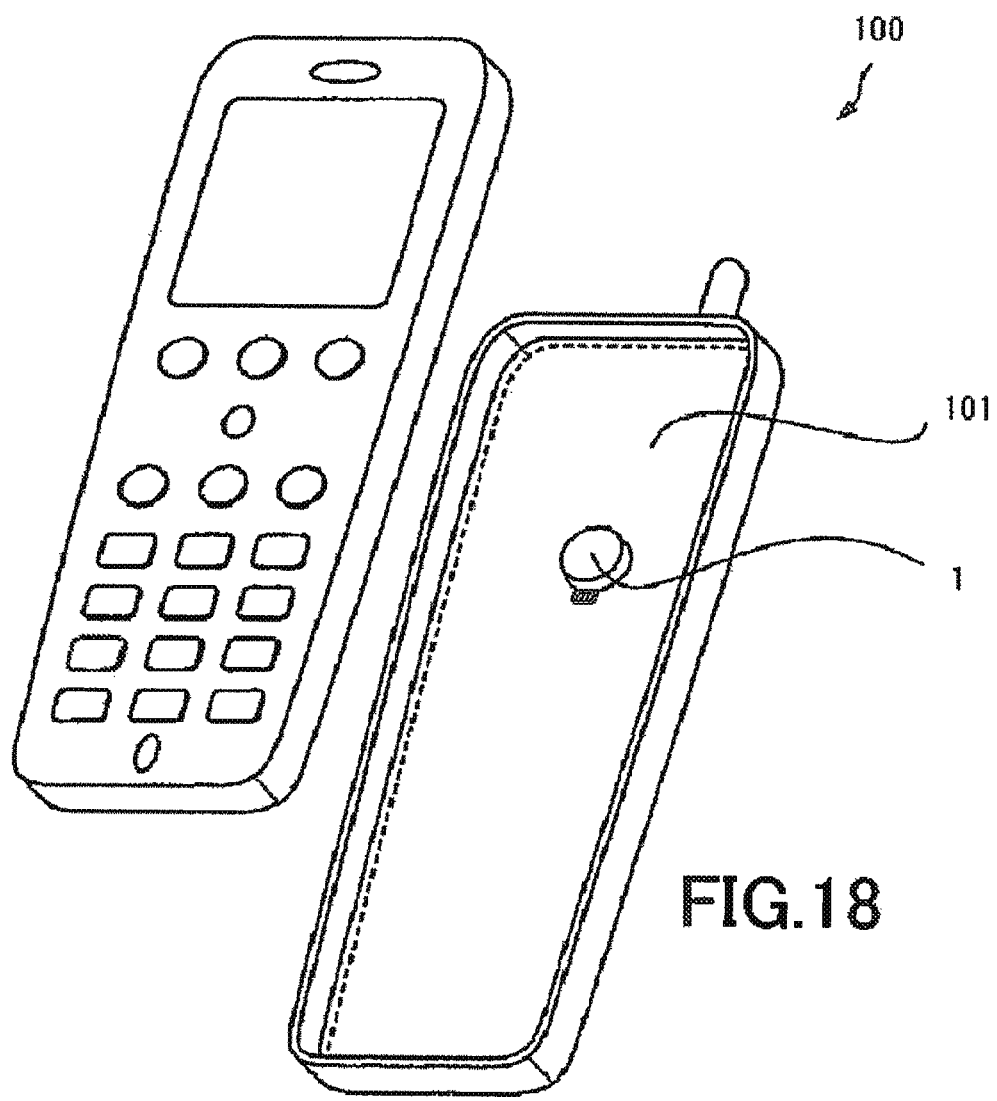
FIG. 18 is a perspective view showing a mobile phone in which the motor according to the invention is installed.
Figure 19:
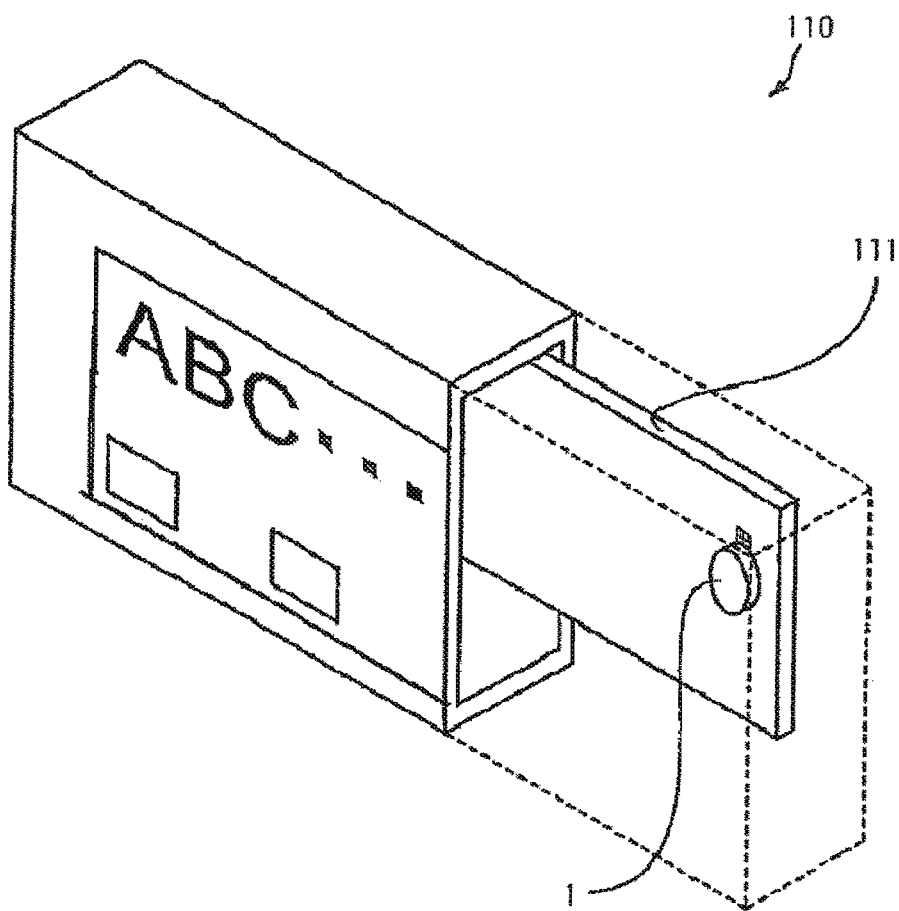
FIG. 19 is a perspective view showing a personal digital assistance terminal in which the motor according to the invention is installed.
Figure 20:
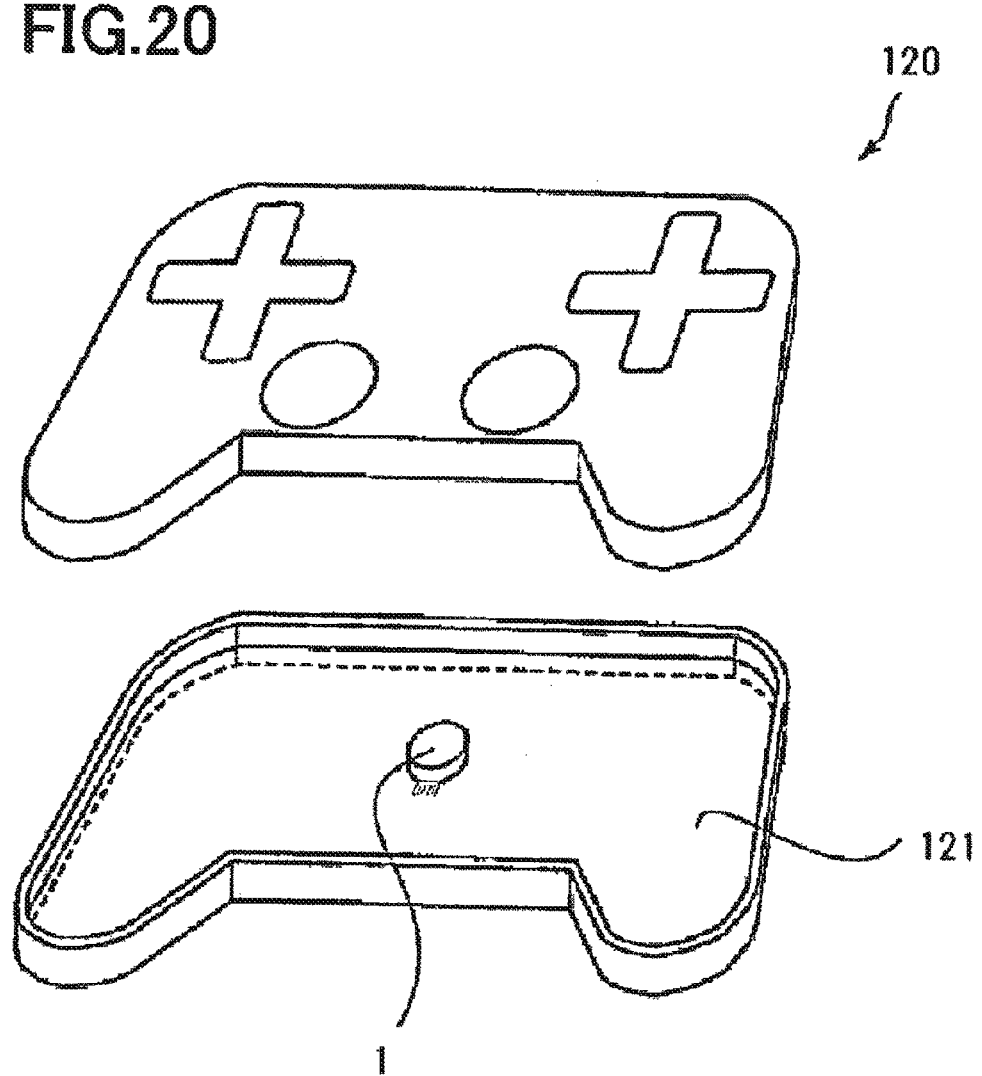
FIG. 20 is a perspective view showing a game machine in which the motor according to the invention is installed.

Thus, while the embodiment of the motor according to the invention has been described variously, various types of vibration alarming equipment can be formed by installing the motor 1 in which the weight 50 is fixed to the salient poles 40a, 40b of the core 32. As is shown in FIG. 18, a mobile communication terminal or a mobile phone having a vibrations alarming function can be formed by installing the motor 1 in an interior of a casing of the mobile phone 100 and connecting a circuit board 101 of the mobile phone 100 with the terminals 48 of the motor 1. In addition, as is shown in FIG. 19, a personal digital assistance terminal 110 having a vibration alarming function which includes, for example, a PDA or a portable digital player can be formed by installing the motor 1 in an interior of a casing of the personal digital assistance terminal and connecting a circuit board 111 of the personal digital assistance terminal 110 with the terminals 48 of the motor 1. In addition, as is shown in FIG. 20, a game machine 120 having a vibration alarming function which includes, for example, a game controller can be formed by installing the motor 1 in an interior of a casing of the game machine, and connecting a circuit board 121 thereof with the terminals 48 of the motor 1. The game machine 120 may be a portable game machine device or a controller for a pinball game machine. In these apparatuses, the motor 1 is rotated appropriately to generate vibrations when a call is received, when the terminal is operated, when the operator touches the screen or in accordance with the progress of a game.

The invention claimed is:

1. A motor having a core configured to rotate around a shaft, a commutator configured to rotate together with the core, and a ring-shaped magnet surrounding the core, the motor further comprising:
 a casing for accommodating the commutator, the casing including an upper case and a lower case;
 a brush assembly including:
  a main body portion configured to move towards the commutator in a direction perpendicular to a rotational axis of the shaft by sliding along an inner surface of the lower case;
  a pair of brush pieces projecting from the main body portion, the pair of brush pieces being configured to slide by holding the commutator therebetween when the main body portion slides along the inner surface of the lower case; and
  a terminal exposed from the main body portion;
 an aligning unit configured to align the main body portion relative to the lower case by engaging the main body portion of the brush assembly with the lower case before the brush pieces come into contact with the commutator; and
 a guiding unit configured to guide the brush assembly in a direction perpendicular to the rotational axis of the shaft after the aligning unit aligns the main body portion relative to the lower case.

2. The motor according to claim 1, wherein the aligning unit includes:
 a slit formed on the inner surface of the lower case and extending in a direction perpendicular to the rotational axis of the shaft; and
 a projecting portion inserted in the slit and projecting from the main body portion.

3. The motor according to claim 2, wherein the aligning unit further includes:
   a stopper portion provided at an end portion of the slit on a shaft side the stopper portion projecting from the inner surface of the lower case, the projecting portion being inserted under the stopper portion and locked thereto.

4. The motor according to claim 1, wherein the guiding unit includes:
   a protruding portion protruding from the lower case and extending in a direction perpendicular to the rotational axis of the shaft; and
   a pair of guide pieces substantially parallel to each other, the guide pieces being provided on the main body portion and configured to hold the protruding portion from both sides thereof.

5. The motor according to claim 1, further comprising:
   a substantially U-shaped cutout portion provided in a lower circumferential edge of the upper case, the cutout portion including:
      a pair of lateral sides parallel to each other and extending in parallel with the rotational axis; and
      an upper side extending between the lateral sides in a direction perpendicular to the rotational axis; and
   insertion grooves provided in the main body portion, the insertion grooves being configured to receive the respective lateral sides therein.

6. The motor according to claim 5, wherein the main body portion includes:
   a projecting portion configured to be pressed by the upper side.

7. The motor according to claim 1 further comprising a weight fixed to the core.

8. A vibrations alarming equipment installing the motor according to claim 7.

9. A mobile communication terminal installing the motor according to claim 7.

10. A personal digital assistance terminal installing the motor according to claim 7.

11. A game machine installing the motor according to claim 7.

* * * * *